United States Patent [19]

Ledoux et al.

[11] Patent Number: 4,986,951

[45] Date of Patent: Jan. 22, 1991

[54] PIPE LINER PROCESS

[75] Inventors: Patrick R. Ledoux, New Orleans, La.; Luc R. Fourgaut, Huegeville, France

[73] Assignee: Pipe Liners, Inc., Metairie, La.

[21] Appl. No.: 188,468

[22] Filed: Apr. 29, 1988

Related U.S. Application Data

[63] Continuation-in-part of Ser. No. 114,949, Oct. 30, 1987, and a continuation-in-part of Ser. No. 77,883, Jul. 27, 1987, Pat. No. 4,863,365.

[51] Int. Cl.$^5$ .................. B29C 63/38; B29C 53/08
[52] U.S. Cl. .................. 264/516; 156/287; 156/294; 264/36; 264/230; 264/269; 138/97; 138/DIG. 5
[58] Field of Search .............. 264/36, 516, 230, 269; 138/97, 98, DIG. 5; 156/287, 294; 425/11

[56] References Cited

U.S. PATENT DOCUMENTS

| | | | |
|---|---|---|---|
| 677,142 | 6/1901 | Richardson et al. | 72/176 |
| 2,423,260 | 7/1947 | Slaughter | 264/560 |
| 2,668,987 | 2/1954 | Harris et al. | 425/392 |
| 2,724,672 | 11/1955 | Rubin | 154/82 |
| 2,955,318 | 10/1960 | Cook et al. | 425/343 |
| 2,971,225 | 2/1961 | Woodruff et al. | 264/230 |
| 2,980,161 | 4/1961 | Howard | 264/145 |
| 3,192,612 | 6/1965 | Elliott et al. | 138/140 |
| 3,335,758 | 8/1967 | Bertolet, Jr. | 138/134 |
| 3,371,770 | 3/1968 | Graham et al. | 425/392 |
| 3,429,954 | 2/1969 | Atkins et al. | 264/22 |
| 3,543,334 | 12/1970 | Sudo | 425/71 |
| 3,560,295 | 2/1971 | Kimbrell et al. | 138/97 |
| 3,755,524 | 8/1973 | McKay | 264/291 |
| 3,758,361 | 9/1973 | Hunter | 156/287 |
| 3,856,905 | 12/1974 | Dawson | 264/269 |
| 3,897,530 | 7/1975 | Leathers | 425/388 |
| 3,959,424 | 5/1976 | Dawson et al. | 264/269 |
| 3,996,967 | 12/1976 | Takada | 156/287 |
| 4,020,136 | 4/1977 | Zaro | 425/388 |
| 4,028,037 | 6/1977 | Dawson | 425/392 |
| 4,207,130 | 6/1980 | Barber | 156/294 |
| 4,233,101 | 11/1980 | Scragg et al. | 156/287 |
| 4,273,605 | 6/1981 | Ross | 156/286 |
| 4,321,740 | 3/1982 | Davis et al. | 29/402.9 |
| 4,361,451 | 11/1982 | Renaud | 156/64 |
| 4,368,091 | 1/1983 | Ontsuga et al. | 156/287 |
| 4,377,894 | 3/1983 | Yoshida | 29/421 R |
| 4,394,202 | 7/1983 | Thomas et al. | 156/94 |
| 4,410,391 | 10/1983 | Thomas et al. | 156/574 |
| 4,427,480 | 1/1984 | Kamuro et al. | 156/287 |
| 4,446,891 | 5/1984 | Gebelius | 138/97 |
| 4,483,167 | 11/1984 | Hayashi | 72/182 |
| 4,496,499 | 1/1985 | Brittain et al. | 264/36 |
| 4,504,171 | 3/1985 | Florence, Jr. | 405/154 |
| 4,627,471 | 12/1986 | Parkes et al. | 138/97 |
| 4,643,855 | 2/1987 | Parkes et al. | 264/36 |
| 4,691,740 | 9/1987 | Svetlik et al. | 138/97 |

FOREIGN PATENT DOCUMENTS 1084224 8/1980 Canada .
0065886 12/1982 European Pat. Off. .

(List continued on next page.)

Primary Examiner—Jan H. Silbaugh
Assistant Examiner—Mathieu Vargot
Attorney, Agent, or Firm—Nixon & Vanderhye

[57] ABSTRACT

Method is provided for lining a pipe wherein a thermoplastic liner is initially formed in a cylindrical shape with a diameter slightly larger than the internal diameter of the pipe. The liner is temporarily deformed at an elevated temperature to a different cross-section, preferably U-shaped, to reduce its overall cross-sectional dimension to facilitate insertion into the pipe to be lined. Once inserted, the pipe liner is reheated to the crystallization temperature of the thermoplastic material to cause the liner to return to its original cylindrical shape. Pressure within the liner is also increased in two stages to cause the liner to conform to the interior surface of the pipe. An expansion pig may also be employed to ensure even more exact conformance. After expansion, ends of the liner which extend beyond the pipe are flared into engagement with the pipe flanges. Service fluid under pressure is introduced into the liner to maintain the liner in its cylindrical shape.

5 Claims, 9 Drawing Sheets

FOREIGN PATENT DOCUMENTS

| | | |
|---|---|---|
| 0098547 | 1/1984 | European Pat. Off. . |
| 1912478 | 10/1970 | Fed. Rep. of Germany ...... 156/294 |
| 2487702 | 2/1982 | France . |
| 2503622 | 10/1982 | France . |
| WO87/03840 | 7/1987 | PCT Int'l Appl. . |
| WO88/04987 | 7/1988 | PCT Int'l Appl. . |
| 536703 | 6/1973 | Switzerland . |
| 275964 | 3/1928 | United Kingdom . |
| 807413 | 1/1959 | United Kingdom . |
| 1340068 | 12/1973 | United Kingdom . |
| 1352829 | 5/1974 | United Kingdom . |
| 1437273 | 5/1976 | United Kingdom . |
| 2003576 | 3/1979 | United Kingdom . |
| 1553408 | 9/1979 | United Kingdom . |
| 2018384 | 10/1979 | United Kingdom . |
| 1580438 | 12/1980 | United Kingdom . |
| 2084686 | 4/1982 | United Kingdom . |
| 2094862 | 9/1982 | United Kingdom . |
| 2080917 | 10/1982 | United Kingdom . |
| 2184194 | 6/1987 | United Kingdom . |
| 2186340 | 8/1987 | United Kingdom . |
| 2188695 | 10/1987 | United Kingdom . |

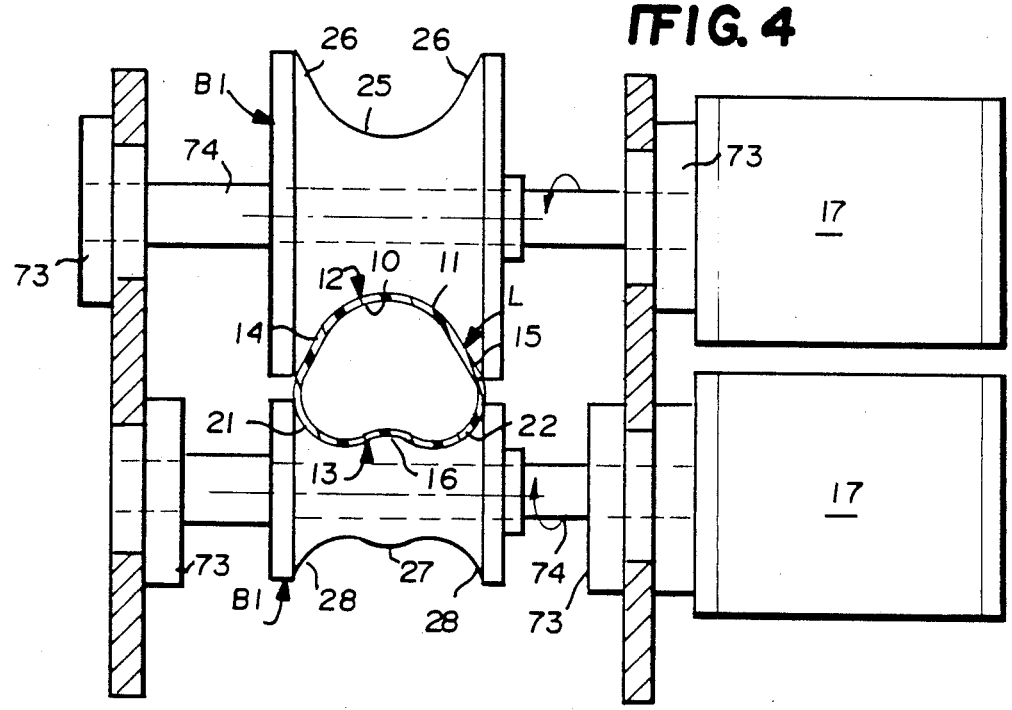
FIG. 4
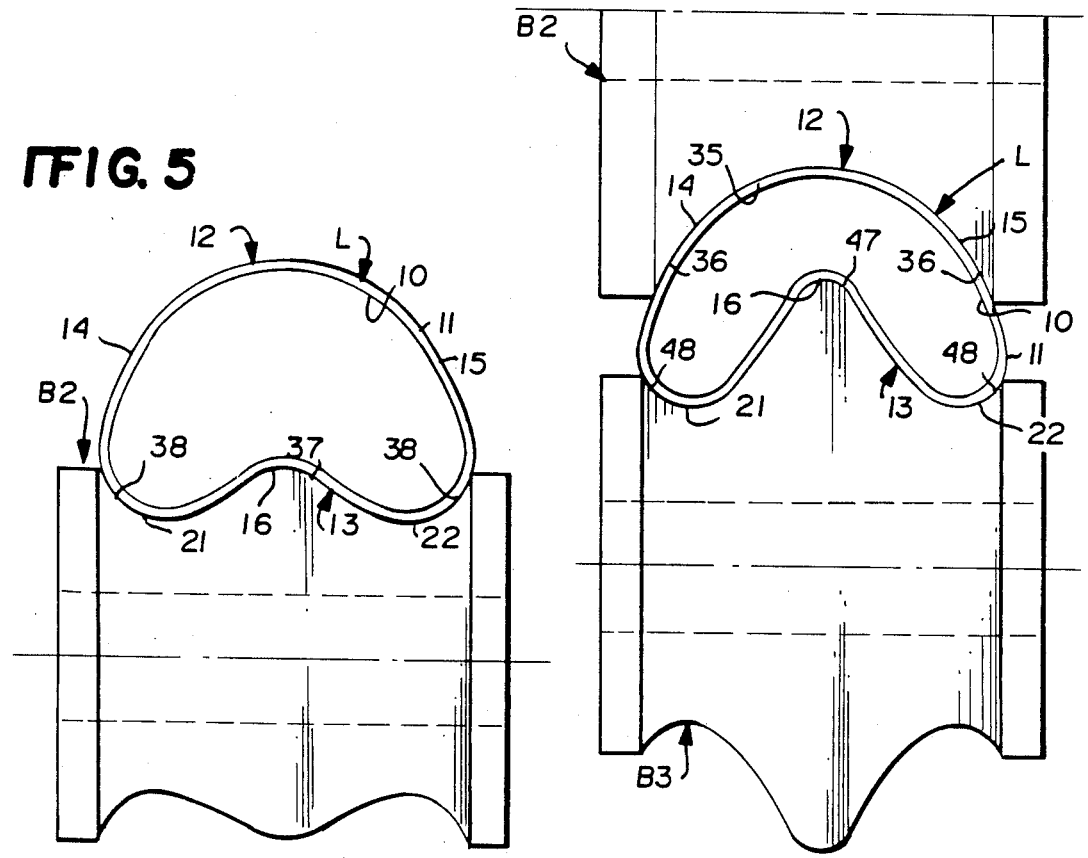
FIG. 5
FIG. 6

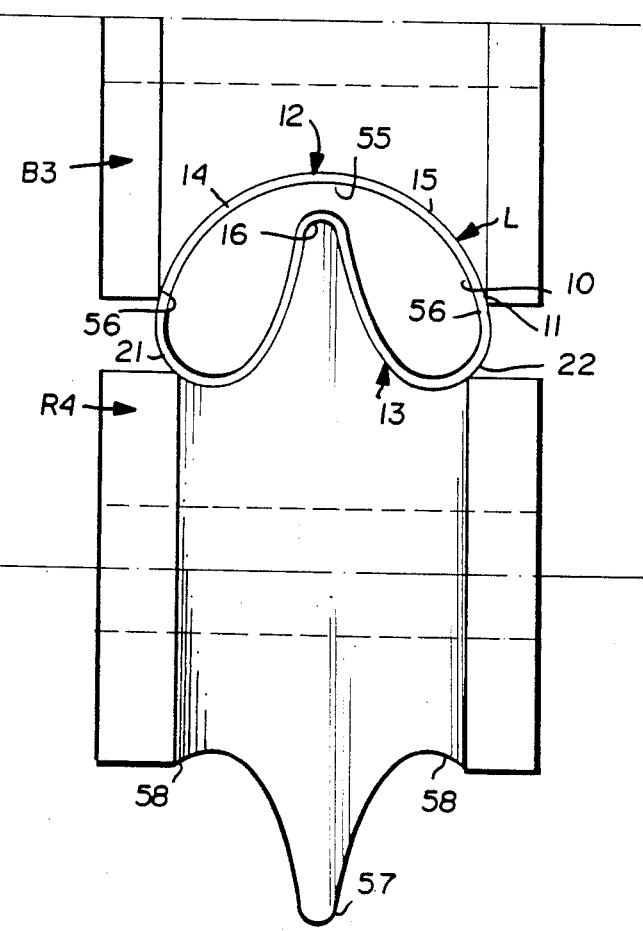
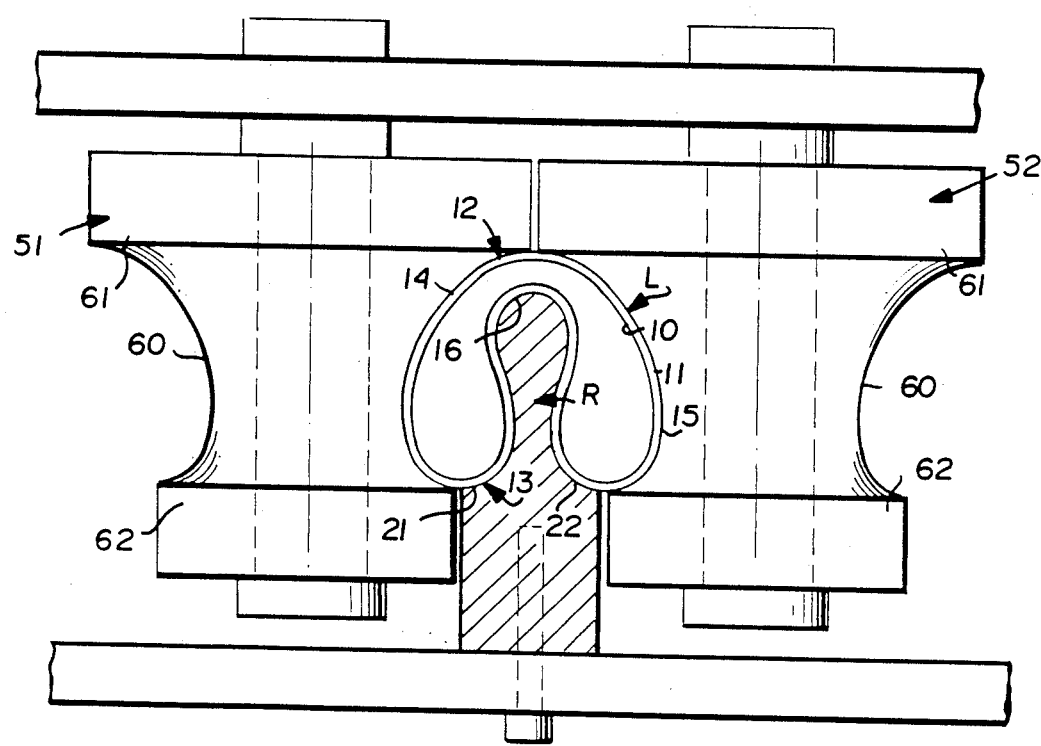

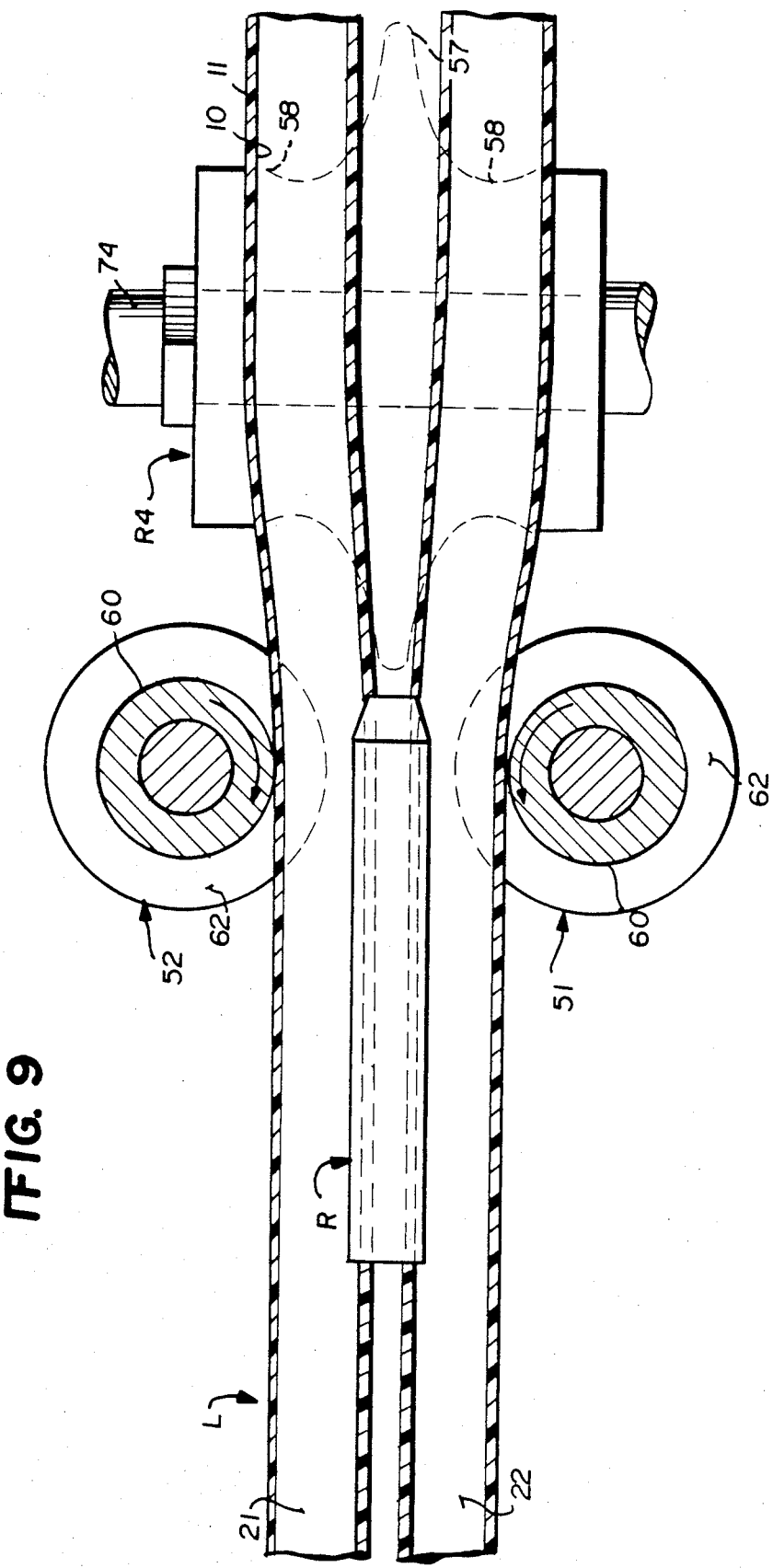

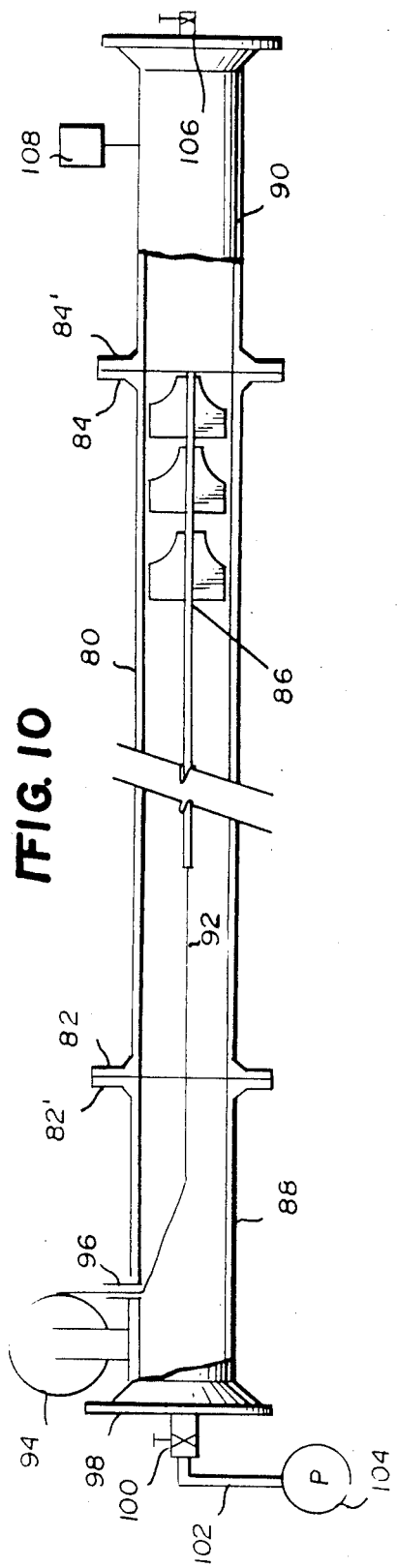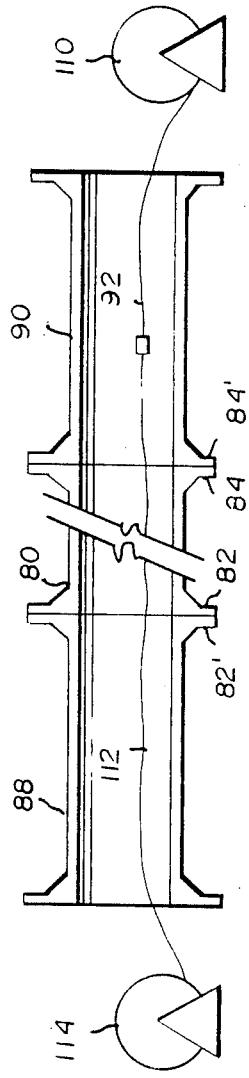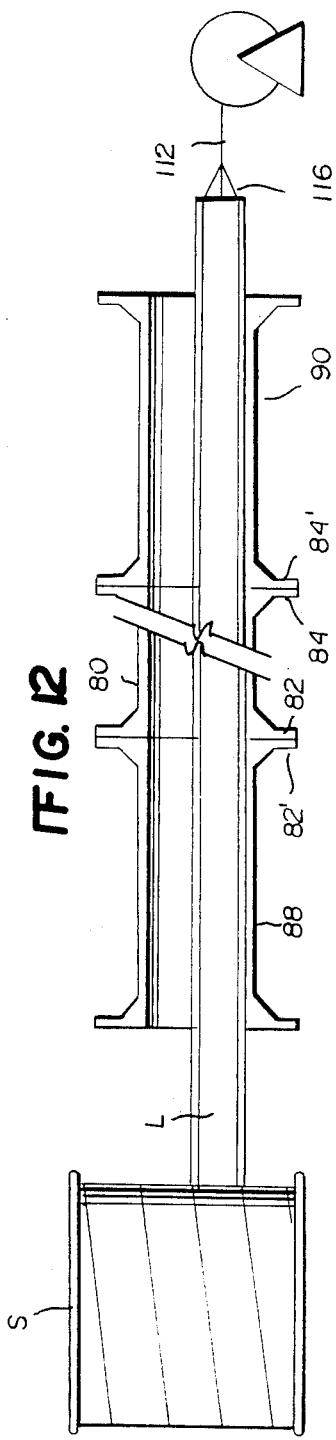

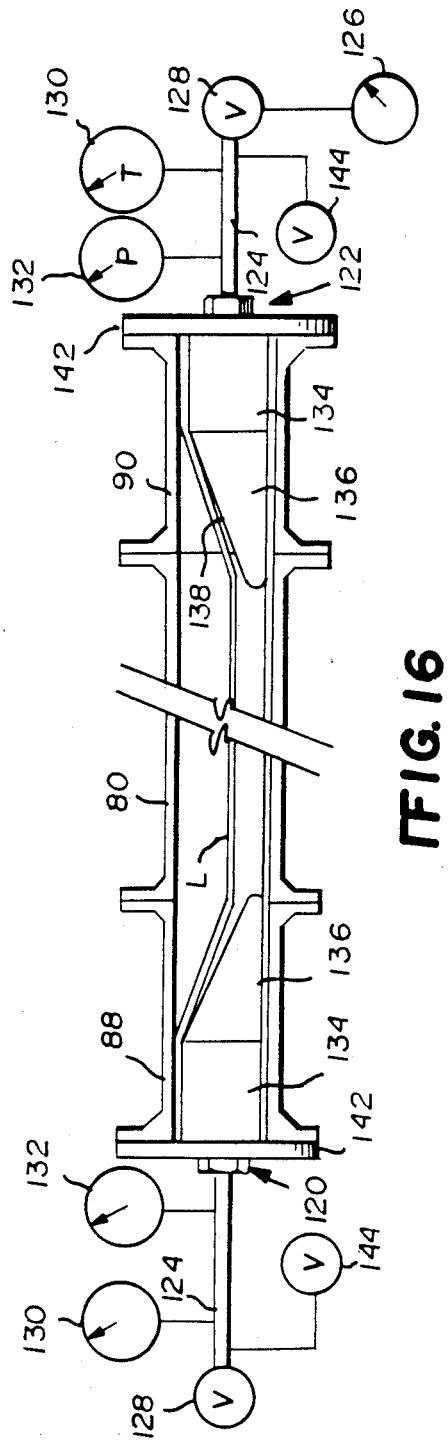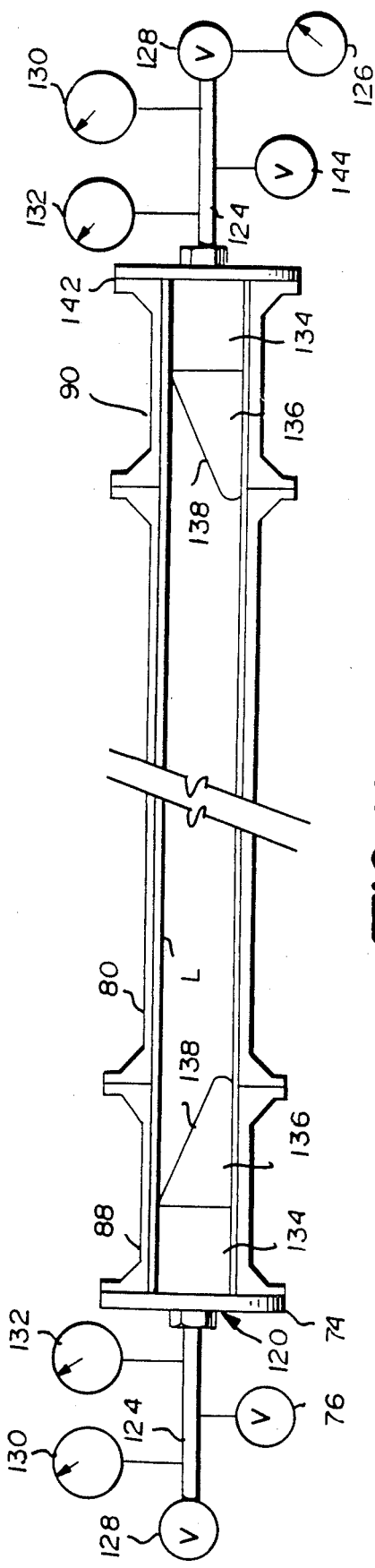

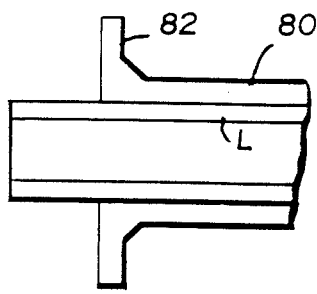
FIG. 20
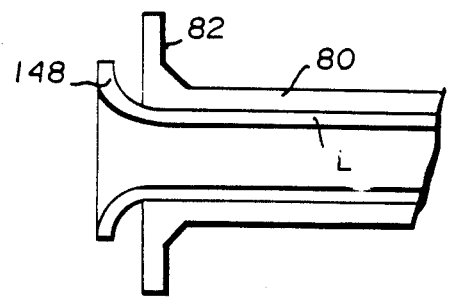
FIG. 21
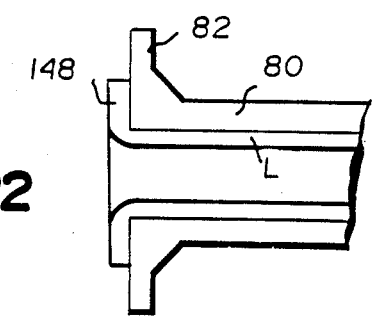
FIG. 22
FIG. 25
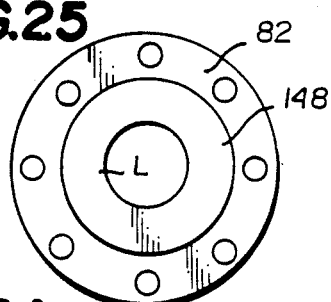
FIG. 24
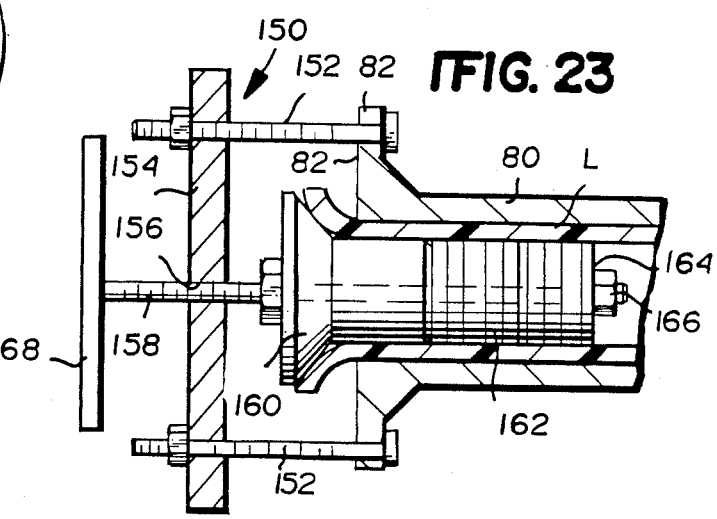
FIG. 23
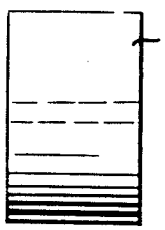
FIG. 26
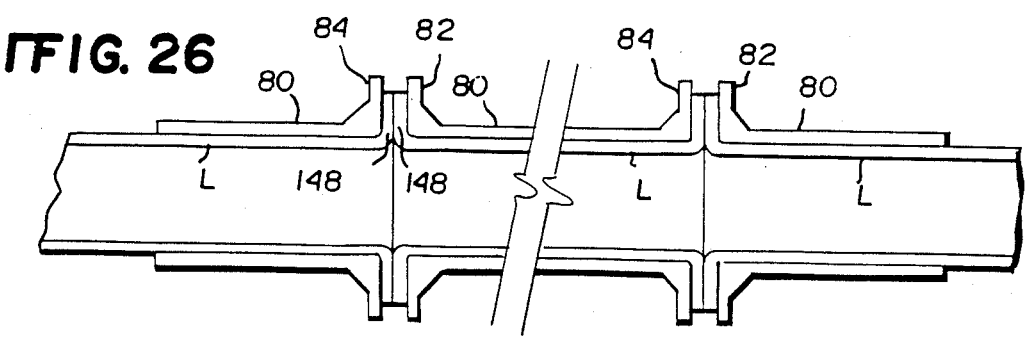

PIPE LINER PROCESS

RELATED APPLICATIONS

This application is a continuation-in-part of U.S. patent application Ser. No. 114,949, filed Oct. 30, 1987 and U.S. patent application Ser. No. 077,883, filed July 27, 1987, now U.S. Pat. No. 4,863,365.

BACKGROUND OF THE INVENTION

This invention relates to the use of thermoplastic liners within pipe lines, either initially or as a repair, for protecting the internal walls from deterioration. For deteriorated or damaged piping, the liner restores the fluid transporting capability of the piping and prevents further interior deterioration. One such liner for protecting the interior of pipe is taught by French Pat. No. 25 03622 dated Oct. 15, 1982.

It is a general object of this invention to provide methods and apparatus for the manufacture of a deformed tube product useful as pipe liners of the type disclosed in the Laurent patent as well as apparatus and methods for inserting the pipe liner within the pipe.

SUMMARY OF THE INVENTION

The present method of manufacturing a deformed tube product involves a first step of extruding a pipe liner having a tubular cross-section, and a second step of deforming the extruded tube into a reduced cross-section for insertion into a pipe as a liner therefor. A feature of this method of manufacturing a tube product is the use of thermoplastic material and its temperature control at the successive stages of formation, during extrusion into its initial and subsequent form, during its deformation, and during its return to ambient usable condition upon installation into the pipe. It is an object of this invention to provide a method and apparatus for the manufacture of pipe liners in continuous deformed lengths as well as methods and apparatus for inserting the liners into pipe for subsequently returning the liners in the pipe to their original unstressed extruded cross-section. In practice, the liner configuration has an outside diameter equal to or slightly greater than the inside diameter of the pipe to be protected, whereby the liner is either unstressed or under slight circumferential compression; either of which conditions is readily accommodated by the plastic liner which relies upon the surrounding pipe for its structural support.

It is another object of this invention to deform an initially extruded tubular cross-section without adverse effect on its structural integrity, and in such a manner that its initially extruded tubular cross-section can be restored. To this end, controlled heat is applied to establish a softened condition of the thermoplastic material after its extrusion, while simultaneously applying deforming tools thereto in order to reduce its cross-sectional configuration. When the desired reduction is achieved, heat is withdrawn and the finished product of continuous length is then stored on spools for storage, transport and subsequent installation.

While a U-shaped reduced tubular configuration is particularly shown and described, it is to be understood that a V-shape or other cross-sectional configurations may be used, whether they be H-shaped or X-shaped, or the like. The U-shape, or V-shape, is presently considered to be the most practical and preferred configuration for such a tube product.

In carrying out this invention, the deformation of the initially extruded tube, preferably of cylinder form, progresses in a gradual manner, by shaping means. That is, at least one side of the tubular extrusion is increasingly depressed so as to condition the tubular extrusion for its lateral collapse into a reduced U-shaped, or V-shaped, cross-sectional form; thus providing a deformed tube. As pointed out above, this deformation is conducted in the presence of controlled heat substantially below fluidity of the thermoplastic material and such that the plastic is deformed without adversely effecting its structural integrity, whether in its deformed condition or in its subsequently re-established initial condition. Preferably, rollers are used to deform the initially extruded tube. In practice, the deformation is gradual, step by step, utilizing combined pairs of opposed shaping rollers. A feature hereof is the lateral collapse of the tubular extrusion over a forming rail, by means of opposed shaping rollers that embrace the forming rail. The finished product is then cooled to ambient temperature during and/or upon its delivery from the forming rail, as by means of a cooling trough. Heating and cooling is by means of heat adsorption or radiant heating, and preferably by temperature controlled water baths or spray.

The present day commercial demand for this pipe liner is a product ranging from 2 inches to 24 inches in diameter. The wall thickness will vary in proportion to diameter as circumstances require. Accordingly, there will be variations in the process steps involving the plurality of shaping means disclosed herein as shaping rollers and back-up roller, whereby at least one side of the tubular extrusion is deformed as required. That is, the number of shaping means and the step by step degree of deformation is variable, depending upon the size and wall thickness an material to be deformed. A feature of this method and apparatus is that the product is pulled out of the extruder and from the deforming tool, for delivery to a storage spool, in a controlled manner, whereby the cross-sectional configuration of the deformed tube product is uniform and within specified dimensional tolerance. With respect to variations in size and tolerances, and especially with respect to larger diameter pipe liners, it is an object of this invention to provide pulling traction on the tube during its process of deformation, and applied to the shaping means, disclosed herein as powered rollers. In practice torque is independently applied to the shaping and back-up rollers, so as to ensure uniform advance of the deforming tube product.

The product herein disclosed is a thermoplastic pipe liner that is reduced from its initially extruded cross-section, so that it can be easily pulled inside a pipe line and then restored to its initially extruded cross-section. Assuming pipe to be round in cross-section, the outside diameter of the initially extruded and/or reformed liner tube is the same or slightly greater than the inside diameter of the pipe that receives it, so that the liner exterior comes into perfect interface contact with the pipe interior and preferably under slight circumferential compression. This interface contact of liner within and with the pipe eliminates any annulus therebetween, and so that the requirement of filling such an annulus is virtually eliminated. A feature of this liner is its thin-wall configuration made of a thermoplastic such as polyethylene, nylon, Teflon$^{TM}$, ABS, or any other such plastic material, whereby the small loss of inside diameter of the flow passage is largely compensated for by the exceptional flow coefficient within the liner made of such a thermoplastic material. For new pipe line projects, expensive pipe materials such as stainless alloys can be substituted with ordinary steel pipe, and lined with this product liner, thereby realizing a cost saving of 1.5 to 2.2, together with the improved fluid tolerance properties of the plastic which can be selected to best advantage. Accordingly, pipe lines which are structurally sound need not be replaced, since this product liner can be installed and replaced as circumstances require.

The method and apparatus herein disclosed for the manufacture of this product liner involves the primary step of extruding thermoplastic tubing, and the secondary step of deforming the thermoplastic tubing. The primary step of extrusion involves generally, an extruder that receives raw plastic material and delivers a tubular cross-section through a vacuum trough that controls the processing temperature and precise configuration of the tubular cross-section. The secondary step of deforming the precise tubular cross-section involves generally, a multi-stage shaping tool that deforms the extrusion at controlled temperature and delivers it through a cooling trough as the finished product liner. The finished product liner is drawn from the secondary step by a puller that controls the linear speed of the production and maintains a constant wall thickness of the finished product liner.

The present invention also relates to an improved method and apparatus for installing the temporarily deformed pipe liner within a pipeline, expanding the deformed liner to its original cylindrical shape, taking additional steps causing the liner to conform even more precisely to the interior contour of the pipe, and flaring opposite ends of the liner into engagement with respective radially directed pipe flanges.

Before inserting the U-shaped liner in a pipe or pipeline section, a number of preparatory steps must be taken. For example, after accessing the pipe to be lined by existing man or access holes, or by digging new access holes, the pipe connections must be broken and the interior of the pipe or pipeline section must be cleaned to remove all loose debris and/or sediment therein. Subsequently, a pulling or pilot line must be threaded through the pipeline to enable the U-shaped liner to be pulled into the pipe from the downstream end. In this regard, throughout this specification, "upstream" refers to that end of the pipe into which the liner is inserted, and "downstream" refers to the end remote from the insertion end. In addition, the term "pipe" is used hereinafter to refer to single, individual lengths of pipe, as well as to a plurality of individual lenths joined together to form a pipeline or section of pipeline. In other words, "pipe" refers to any one or more lengths of pipe to be lined in accordance with this invention. Moreover, regardless of the number of individual lengths of pipe to be lined, typically, the open ends of the pipe or pipes, which define the overall length to be lined, are provided with conventional radial flanges to facilitate attachment to adjacent pipe sections. Such flanges are also utilized in conjunction with the installation process and apparatus of this invention as explained in greater detail below.

The cleaning and threading operations may be effected by a single brush pig of conventional design. At the same time, the brush pig is utilized to pass the pilot or pulling line through the pipe. To facilitate not only the pigging operation, but the liner insertion and expansion operations as well, a manifold, which opens into the pipe at one end and which is closed by a removable flange at the other end, is applied to each end of the pipe, via the above-described radial flanges and fasteners such as bolts or the like. The inside diameter of the process manifold is larger than the outside diameter of the liner, to aid in the removal of the manifold after the expansion process. The same manifold size is also used as a "pigging station." Prior to attaching the manifold at the upstream end, the brush pig is introduced into the manifold, and a pulling or pilot line is fed into a vent in the manifold and attached to the trailing end of the pig.

Once the manifolds are attached at either end of the pipe, liquid or air is supplied behind the pig to drive it the length of the pipe. At the same time, a relief valve in the downstream manifold permits air ahead of the pig to be released from the pipe interior. Brushes attached to the front of the pig clean the interior pipe wall surface in a manner well understood by those skilled in the art.

When the pig and pulling lines have reached the downstream end of the pipe, the downstream manifold is opened and the pig removed. The pulling line is then attached to a downstream winch or other suitable winding device.

At the upstream end, the upstream manifold is opened and the pilot or pulling line cut from the supply reel. The line is then drawn through the open manifold and attached to a lead end of the U-shaped liner. The U-shaped liner may then be pulled from its own supply reel into the pipe via actuation of the downstream winch or other suitable winding device.

It will be appreciated that depending on the length of pipe, the pressure available to push the pig through the pipe, and the tensile strength of the pulling line, a multiple stage process may be required to thread the final pulling line through the pipe. For example, for long sections of pipe on the order of 2 miles or even longer, or where there is a leak in the pipe, the pressure build-up in the pipe may not be sufficient to push the pig and, at the same time, pull a line or cable of the required strength through the pipe. In this case, a relatively light, so-called "fishing line" is initially threaded through the pipe by a relatively lightweight pig, followed by one or more increasingly stronger lines, drawn by larger pigs, until the final pulling line or cable is drawn through the pipe.

Once the liner is drawn into the pipe via the downstream winch, it is cut to an appropriate length, such that a relatively short section of liner extends beyond either end of the pipe, i.e., to approximately the length of the pipe section itself plus upstream and downstream manifolds at either end. Subsequently, packer/expander assemblies are introduced into the manifolds to seal the liner ends and to mechanically initiate expansion of the liner. Thereafter, fluid, preferably hot liquid from a closed boiler system, is supplied through one of the packer/expander assemblies and into the pipe to reheat the liner to a temperature which is to be above the raw materials' crystallization point. During the reheating stage, an outlet valve in the manifold opposite that through which the hot liquid is supplied, is left partially open to allow the hot liquid to flow through, until the desired temperature is achieved. Once the liner has reached a temperature above the raw materials' crystallization temperature, it will begin to assume its original cylindrical shape. At the same time, pressure within the liner rises, preferably to about 7 bars in a first pressurizing stage.

It is often the case, however, that the pipe itself may not be perfectly round along its entire length and, therefore, absent some further step, there may be annular or other pockets of air between the liner and the inner pipe wall.

According to this invention, the outlet valve is adjusted so that the pressure within the liner is increased in a second stage to about 15 bars to cause the liner to conform more precisely to the inner surface contours of the pipe. It is to be understood that the second-stage pressure application can be considered optional and will depend on the condition of the pipe to be lined as well as the wall thickness of the liner.

Subsequently, the packer/expander assemblies are removed after the hot liquid, such as water, is emptied from the pipe through a valve in the manifold. A calibrated pig is then introduced into the upstream manifold to traverse the pipeline while the liner is still hot, and to apply a radially outwardly directed force about the circumference of the liner to squeeze out any remaining air between the liner and pipe used to thereby ensure even further conformance to the inner pipe wall, including weldments and other surface irregularities. This second pig is driven through the pipeline with cold water which tends to to "freeze" the liner in place.

Once liner expansion within the pipe is completed, the upstream and downstream manifolds are removed, and the liner ends are reheated and flared into contact with the blind flanges of the pipe, as described in further detail below.

By this invention, pipes of between 2 and 24 inches in diameter, and as long as two miles or more may be fitted with a continuous liner to provide ideal corrosion protection in both new and existing corroded pipes.

Other advantages of this invention include:

1. Structural characteristics of the pipe to be relined are preserved while the thickness of the U-Liner wall can be from 3.5 to 18 mm, depending on design requirements. The minimal reduced inside diameter will be compensated by the exceptional flow coefficient of the thermoplastic liner.

2. In the case of new pipe projects, the U-shaped liner can be used to avoid the need for expensive materials such as stainless steel or alloys for transport of highly corrosive products. In most cases, the flow inside the plastic liner will be more efficient than if stainless steel or alloy pipes are used.

3. Lining of internally corrodible pipes will provide operators with longer life in both new and repaired pipelines, without costly total replacement of pipe sections due to corrosion damage. This will effectively reduce repair and maintenance downtime and therefore greatly reduce production loss.

4. Since the U-shaped liner can be inserted in very long sections, this method simplifies the often difficult and much protested surface disturbance of right-of-way in environmentally sensitive areas or across urban concentrations of people and traffic.

5. Although the normal use life expectancy of the thermoplastic lining is up to one hundred years, unexpected damage can be repaired economically due to the easy removal and replacement of the U-Liner and its relatively minimal cost. The thermoplastic insert U-Liner will restore corroded pipes to original flow quality and eliminate further abrasion and corrosion damage to the steel pipe walls, thus substantially lengthening the economic life of the installation.

6. The process is simple, fast and cost effective, with minimum downtime.

In a preferred embodiment, the pipe liner is constructed of high density polyethylene (HDPE), which may be a Union Carbide DGDB-2480 Black 4865 compound meeting the requirements of ASTM 1248-81$a$ for Type PE 34 Class C product. It is characterized by a high level of environmental stress cracking resistance and high strength. Nylon, Teflon TM, ABS or any other such plastic material may also be utilized.

The preferred HDPE liner material has been tested with over 280 chemicals that might be expected to flow through a pipeline and the following observations have been reported relating to the above identified HDPE which are particularly relevant to this invention:

(a) high resistance to $H_2S$, $CO_2$ and NaCl;
(b) excellent for transporting gases;
(c) cross-linkable to handle products at high temperatures (250° F.);
(d) stability in aging;
(e) low roughness coefficient of 0.020;
(f) does not retain deposits or sediments.

It will be appreciated from the foregoing that heat is used to relieve the stress in the liner in order for the liner to remain and to be frozen in its original cylindrical shape after processing has been completed. However, it has been found in accordance with another aspect of the present invention that this stress relief can also be obtained without a temperature increase provided the pressure within the pipe is maintained over a predetermined time period in order to relieve the stresses and ensure that the liner will remain in its generally cylindrical shape bearing against the interior wall of the original pipe. This discovery is particularly important in the relining of pipelines which normally carry a fluid under pressure, i.e., gas or liquid, wherein the pressure of the fluid carried by the relined pipeline is sufficient to maintain the liner in its generally cylindrical shape.

In accordance with this aspect of the present invention, once the deformed liner is disposed in the pipe and the opposite ends of the liner are deformed at each end of the manifold as described previously, instead of heating the pipe, a pig is then inserted into the pipe to mechanically reform the liner into a generally cylindrical configuration. To accomplish this, the pig is preferably inserted at the downstream end of the pipe (although it may be inserted at the upstream end) and a pressurized fluid, either a gas or liquid but preferably a gas, such as air, is introduced into the pipe behind the pig. Preferably, a backpressure is provided at the upstream end of the pipe. For example, the fluid behind the pig may be pressurized to about 25 to 150 p.s.i., while the upstream end of the pipe may be pressurized to about 5 to 40 p.s.i. As the pig travels through the liner, it reforms the liner into its original cylindrical shape. At the end of the travel of the pig, the liner is maintained under internal pressure for a predetermined time, for example, on the order of about 30 minutes. The pressure is then relieved, the pigs and the manifolds are both removed, the opposite ends of the liner are flared, all as described previously, and service to the pressure fluid is restored. Particularly, such service is reconnected within a relatively short period of time, on the order of about 24 hours or less, so that the interior of the liner is repressurized by the pressure of the service fluid to maintain the liner in generally cylindrical form bearing against the inner walls of the pipe. Consequently, the pressure will ensure that the liner conforms to the existing pipe and, over time, all stresses are relieved such that the liner will remain substantially cylindrical even when the service pressure is removed.

It will be appreciated that the foregoing described method of relining pressurized pipelines may be applied to non-pressurized pipe, provided the liner is maintained under pressure over a predetermined time. For example, maintaining the pressure for a time on the order of 3 to 4 weeks will in most cases ensure that the liner returns and is retained in its prior cylindrical configuration. For shorter periods of time, for example, less than one week, the liner may not return to and be retained in its perfectly cylindrical configuration. However, sufficient stress is relieved in such shorter period of time such that the liner will be maintained generally cylindrical. The capacity to return to and to retain its generally cylindrical original configuration is a function of the diameter, material and wall thickness of the liner. Thus, the greater the diameter and/or thickness, the greater the time period the liner should be maintained under pressure in order to return to and to be retained in its original cylindrical configuration. The converse is also true.

The invention as described herein has applications to many types of pipeline, including water and mud injection; oil and gas; vapors and fumes; saltwater; utility sewage and drainage; gas gathering and distribution, etc.

There is provided in accordance with a preferred embodiment of the present invention a method for producing a deformed pipe liner of tubular cross-section having an outside diameter to fit into a pipe line and formed of plastic material for subsequent insertion into a pipe line and then reformed to the cross-section wherein the improved method is characterized by firstly collapsing the tubular cross-section at a deformable portion thereof by folding it by depression diametrically toward an opposite side portion thereof along a plane of bilateral symmetry about which opposite side sections of the tubular cross-section bend into double-wall configurations with the fold juxtaposed to the opposite side portion of the tubular cross-section, secondly collapsing the opposite side sections of double-wall configurations laterally toward the plane of bilateral symmetry by bending the double-wall configuration of the opposite side sections, thereby reducing the cross-sectional configuration without elongation and for insertion into the pipe line and reformation therein to its initial tubular cross-section to fit within the pipe line.

There is further provided in accordance with a preferred embodiment of the present invention an apparatus for producing a deformed pipe liner having a tubular cross-section and formed of plastic material for subsequent insertion into a pipe line and then reformed to the extruded cross-section to fit the inside diameter of the pipe line, wherein the improved apparatus is characterized by at least one revolvable back-up roller disposed on a horizontal axis parallel to the axis of and in opposition to at least one revolvable shaping roller, the back-up roller having a concave spool-shaped periphery centered at a plane of bilateral symmetry to engage a back-up portion of the tubular cross-section, the shaping roller having a convex fold initiating and fold shaping perimeter at the plane of bilateral symmetry to depress a deformable portion of the tubular cross-section diametrically toward the back-up portion thereof and along the plane of bilateral symmetry about which opposite side sections of the tubular cross-section bend into double wall configurations with a fold thereof juxtaposed to the opposite back-up portion of the tubular cross-section and a pair of laterally positioned revolvable shaping rollers disposed on vertical axes at opposite sides of the plane of bilateral symmetry and each having a concave curvilinear periphery to engage and further depress the double-wall configurations of the side sections laterally inward toward the plane of bilateral symmetry by bending the double-wall configurations of the opposite side sections, thereby reducing the cross-sectional configuration of the tubular cross-section and further collapsing the opposite side sections thereof from a top dead center position thereof coincidental with the plane of bilateral symmetry.

A further preferred embodiment of the present invention provides a process for installing a hollow cylindrical thermoplastic liner in a pipe wherein the process is characterized by the steps of altering the cross-sectional shape of the liner to reduce the cross-sectional dimension thereof at a shape memory activation temperature, pulling the altered liner into the pipe such that the tubular liner extends beyond opposite ends of the pipe, reheating the liner to the memory activation temperature to cause the liner to return to the cylindrical cross-sectional size and shape and, subsequently, increasing pressure within the liner to cause the liner to conform to interior contours of the pipe.

A still further preferred embodiment of the invention provides a process for installing a thermoplastic liner in a substantially round pipe having inside and outside diameters wherein the process is characterized by forming at a first elevated temperature a thermoplastic liner having a cylindrical shape and an outside diameter larger than the inside diameter of the pipe, temporarily deforming the cylindrical liner at a second elevated temperature to an altered cross-sectional configuration which reduces the cross-sectional dimension of the liner by about 25%, cooling the liner to ambient temperature, inserting the liner in the pipe, reheating the liner to at least the second elevated temperature to cause the liner to return to the cylindrical shape and applying additional expansion forces to the liner to substantially conform the liner to the pipe.

A still further preferred embodiment of the present invention provides a process for installing a thermoplastic liner in a pipe comprising the steps of providing a hollow generally cylindrical liner formed of thermoplastic material, altering the cross-sectional shape of the liner to reduce the cross-sectional dimension thereof, disposing the altered liner into said pipe such that the liner extends beyond the opposite ends of the pipe, mechanically reforming the liner to cause the liner to return to its generally cylindrical cross-section and bear against the inner walls of the pipe and pressurizing the interior of the liner from end to end and for a predetermined time to maintain the liner against the interior walls of the pipe and to relieve the stresses in the liner tending to cause the liner to return to its altered shape.

Other objects and advantages will become apparent from the detailed description of the invention which follows.

BRIEF DESCRIPTION OF THE DRAWINGS

FIGS. 4 through 9 are enlarged detailed sectional views taken substantially as indicated by lines 4—4, 5—5, 6—6, 7—7, 8—8 and 9—9 in FIG. 3;

FIG. 10 is a schematic side view showing a pilot line being pulled through a pipe section to be lined in accordance with the invention;

FIG. 11 is a schematic, side view illustrating a further step in a pipe lining process wherein a heavier gauge pulling line is being pulled through the pipe section to be lined;

FIG. 12 is a schematic top view illustrating a temporarily deformed pipe liner being pulled through a pipe section in accordance with the invention;

FIG. 16 is a schematic side view illustrating the commencement of a pipe liner expansion process in accordance with the invention;

FIG. 19 is a side schematic view illustrating a fully expanded pipe liner in accordance with the invention;

FIGS. 20-22 represent a schematic progression illustrating the formation of a radial flange on a pipe liner in accordance with the invention;

FIG. 23 is a top sectional view illustrating a flaring tool in accordance with the subject invention;

FIG. 24 is a side view of a tool element for use with the flaring tool illustrated in FIG. 23;

FIG. 25 is an end view of a pipe lined in accordance with the invention; and

FIG. 26 is a side schematic view illustrating a plurality of aligned pipe sections with individual pipe liners in accordance with the invention.

DESCRIPTION OF THE PREFERRED EMBODIMENTS

Figure 1:
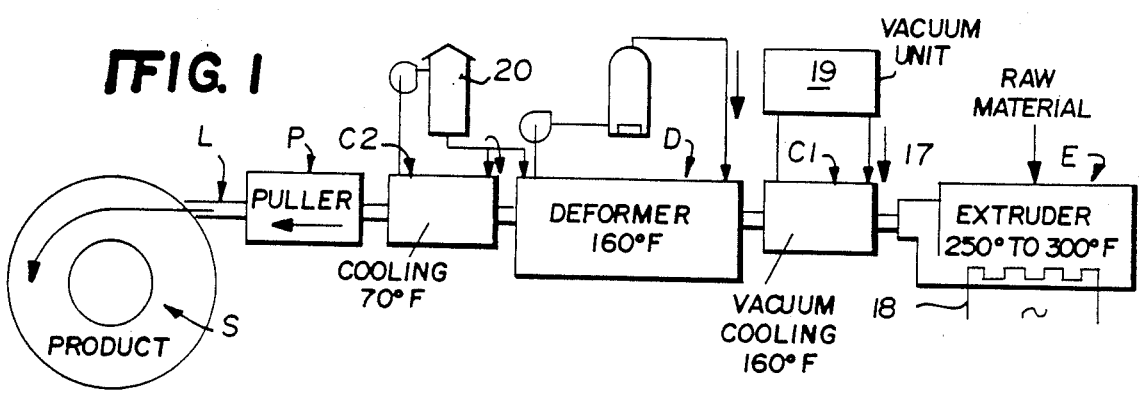
FIG. 1 is a block diagram illustrating the method of producing an extruded plastic pipe liner for restoration to its initially extruded cross-sectional configuration.

Referring now to the drawings, this invention is concerned with lining new and old pipe lines with a deformed tube that is pulled into the pipe line and then reformed to tightly fit therein. The tube can be made of any suitable material which will collapse and subsequently return to its original cross-section, i.e., a plastic. In practice, the pipe liner is a thin-walled plastic sleeve extruded in continuous lengths and later inserted into pipe lines for internal protection; for example to protect new pipe lines and to reconstitute deteriorated pipe lines as well.

Accordingly, the pipe liner L as it is disclosed herein is initially extruded so as to have an exterior diameter at least as large as the interior diameter of the pipe into which it is to be inserted, and preferably slightly in excess of said pipe diameter in order that the tubular pipe liner L is under slight circumferential compression when it is in operating position in the pipe line. A feature of this invention is the deformation of the tubular pipe liner L, to decrease its cross-section configuration for storage and to facilitate its insertion into a pipe. That is, the original cylinder cross-section of the pipe liner L is collapsed and later restored, all without destroying its dimensional properties. Therefore, the circular configuration of the pipe liner L is not stretched, even though the material is plastic and subject to flow. In other words, the original cylindrical cross-section properties of the initially extruded pipe liner L are preserved in its deformed condition which enables its insertion into pipe lines and for its subsequent reformation into its original cylindrical cross-section. The characteristic feature of this invention is that the initially extruded thermoplastic pipe liner L is shaped and thereby deformed without elongation, whereby its dimensional properties necessary for restoration are retained.

Referring now to the deformation of pipe liner L as shown in FIGS. 2a through 2e of the drawings, the initially extruded configuration is cylindrical, having inner and outer diameter walls 10 and 11. As shown, there is an upper back-up section 12 and a lower deformable section 13. The deformation is bilaterally symmetrical and disposed about a vertical plane a of symmetry and about which the tube formation is collapsed by means of bending and folding. Accordingly, there are opposite side sections 14 and 15 which are established by a center fold 16 that inverts the lower deformable section 13 upwardly into juxtaposed relation to the inside diameter 10 of the back-up section 12. Therefore, each side section is comprised of a side wall depending from top dead center of the tube form and bent inwardly so as to continue upwardly to the center fold 16. It is significant that the two side sections 14 and 15 are thereby collapsed into double wall configurations which are further collapsed inwardly toward the center plane a of symmetry as clearly shown in FIG. 2e which is the desired product formation.

Referring now to FIG. 1 of the drawings, the entire method of tube formation and deformation is illustrated in its general form. As shown, there is an extruder means E followed by a cooling means C1 that delivers the tube form into a deformer apparatus D which performs the product deformation process. Following the deformation process, the product is then delivered through cooling means C2 so as to establish it at ambient temperature for delivery through a puller means P and onto a storage spool S or the like. The extruder means E is state of the art and receives the raw thermoplastic material and forces it through an extrusion die 17 at, for example, 350° to 440° F. using heating means 18 to attain that temperature. The cooling means C1 is state of the art, and preferably a vacuum cooling means supported by a vacuum cooling unit 19 and reducing the tube form temperature to, for example, 260° F. The deformer apparatus D is subjected to heat control means H that maintains this necessary deformation temperature of, for example, 260° F. The cooling means C2 is state of the art and reduces the tube form temperature to ambient, and it is supported, for example, by a cooling tower 20 or the like. During the cooling period, the shape of the deformed liner is to be maintained until the pipe reaches an ambient temperature. This shape can be maintained by outside pressure such as rollers, caterpillars, or straps, or maintained by an internal vacuum.

The means C1 and C2 include pump means for water recirculation, and it is to be understood that the aforementioned temperatures can vary as circumstances require. Puller means P is also state of the art and draws the finished deformed tube product from the preceding apparatus, its pulling force being controlled so as not to stretch or compress the tube form in the process of its deformation, and thereby controlling its wall thickness.

Referring now to the method or process of deforming a continuously extruded tube form of plastic material, the steps thereof are sequentially as follows: firstly, a cylindrical tube form is extruded as shown by phantom lines in FIGS. 2a through 2e, thereby establishing a uniform wall section, and preferably of cylindrical configuration. The top semi-circular portion, namely the back-up section 12, is supported and the fold 16 is impressed at bottom dead center of the tube form in alignment with the center plane of symmetry and progressing upwardly and into juxtaposed relation to the inside wall 10 of the tube form at top dead center thereof. It is to be understood that the deformation process can be performed on any angle, such as prescribed above on a dead center bottom, but also from its side, top or any other angle. In this process of deformation, the opposite side sections 14 and 15 are turned and/or bent inwardly at their lower extremities 21 and 22, so that the walls thereof continue upwardly within their respective inside walls 10 and to the fold 16 (see FIGS. 2a through 2d).

The fold 16 is formed by bending the tube form inwardly at bottom dead center thereof for collapse along the center plane of symmetry. Simultaneously with this collapse, the lower extremities 21 and 22 of the side sections 14 and 15 are also inwardly bent as above described. In practice, collapse of the tube form is preferred in a multiplicity of steps, in order to conform gradually to the changing configuration of the tube form and without elongation of its cross-sectional configuration. However, it is to be understood that collapse as thus far described can be accomplished in a single step, for example in small diameter tubing. As shown, however, there are four steps of collapse along the center line a of symmetry, and each of which has back-up against the top section 12, it being the bottom section 13 that is deformed.

Figure 2A:
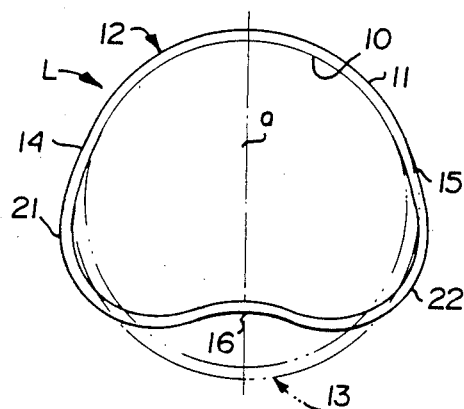
FIGS. 2a, 2b, 2c, 2d and 2e are sectional views of the extruded pipe liner in its sequential stages of deformation, and showing in phantom line the cylindrical configuration of the finished liner for comparison of the deformation in each figure.
Figure 2B:
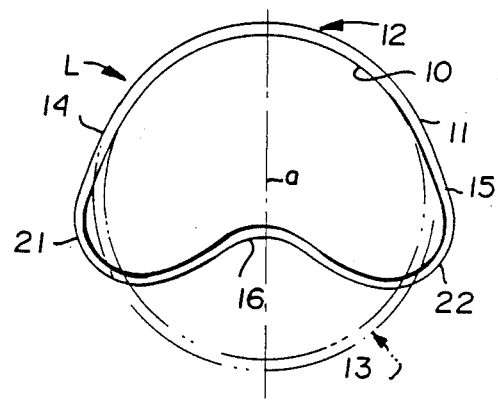
Figure 2C:
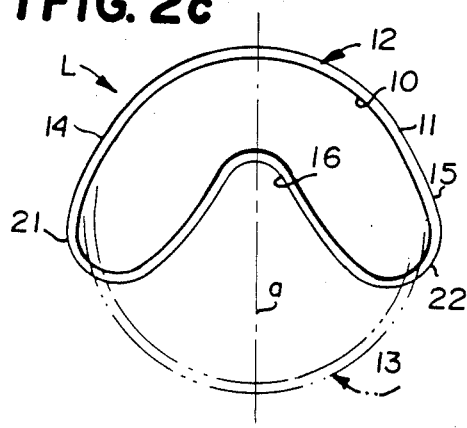
Figure 2D:
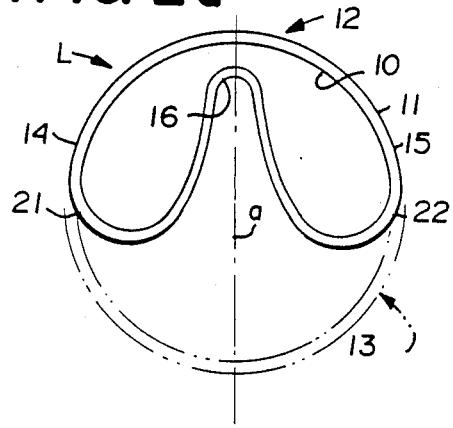

The first step of collapse shown in FIG. 2a initiates the fold 16 by bending and commences to bend the lower extremities 21 and 22. The succeeding three steps of FIGS. 2b and 2c and 2d progressively and increasingly bend and move the fold 16 close to the inside wall 10 at the top dead center of the tube form and simultaneously increasingly and progressively bend and move the lower extremities 21 and 22 upwardly as shown. Thus, the tubular cross-section is reduced in its sectional configuration.

Figure 2E:
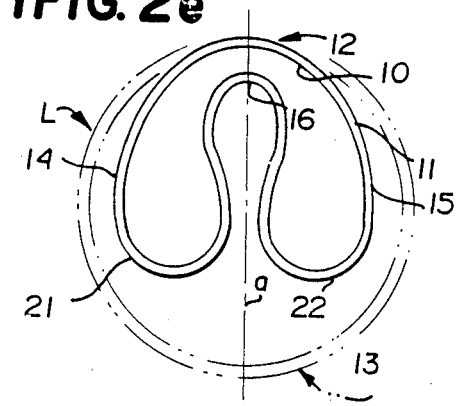

Referring now to FIG. 2e of the drawings, a final step of collapse is performed by bending the opposite side sections 14 and 15 inwardly toward the center plane of symmetry, in order to reduce the arcuate configuration of said two side sections and so that they occur within the radius or outside diameter of the initial tube form, and so as to clear within the inside diameter of the pipe line into which the ultimate pipe liner L is inserted. A feature of this final collapsing step is bringing together the two lower extremities 21 and 22 into juxtaposed relation to the center plane of symmetry, and preferably closer together than the continuing tube walls upstanding therefrom to the bends of fold 16.

Figure 3:
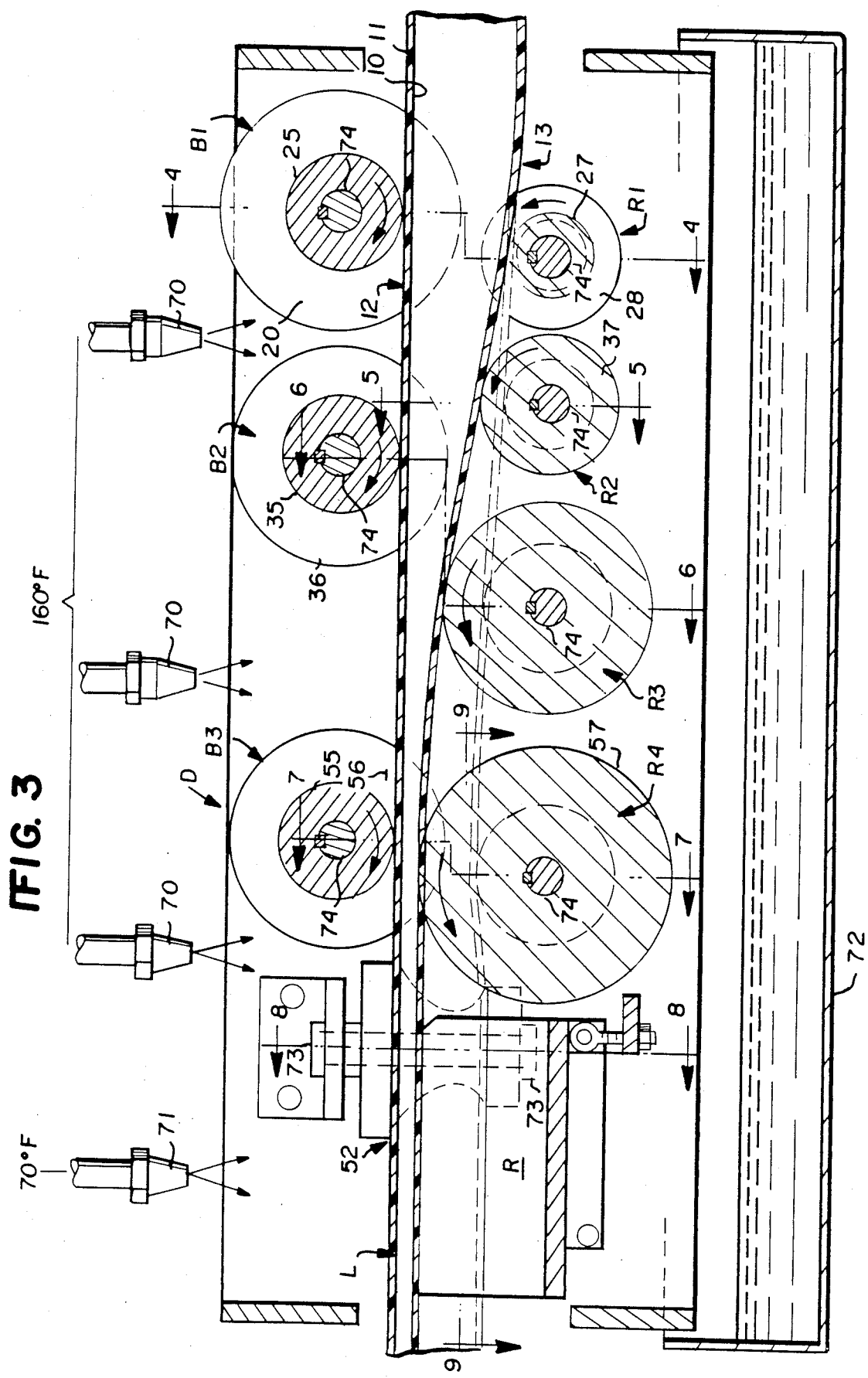
FIG. 3 is an enlarged longitudinal sectional view of the deformer apparatus which performs the method herein disclosed to deform extruded thermoplastic tubing.
Figure 17:
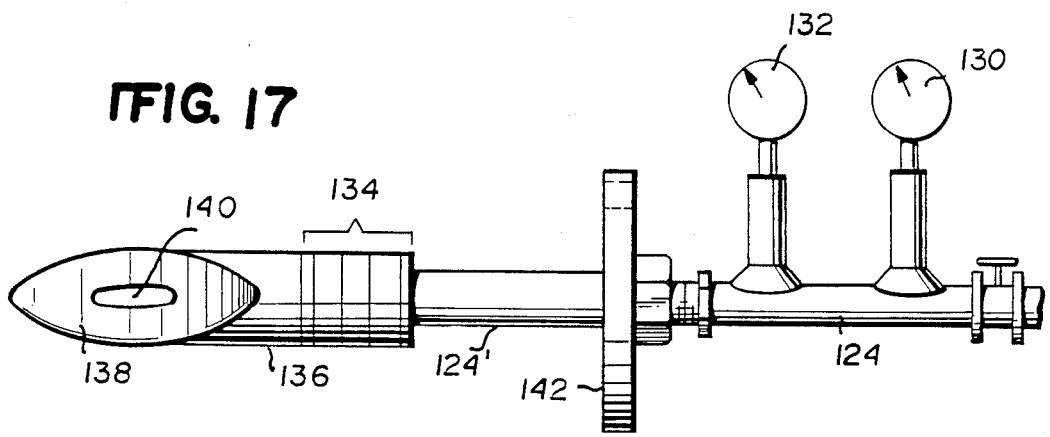
FIG. 17 is a side elevation of a packer/expander assembly for use in the subject invention.
Figure 18:
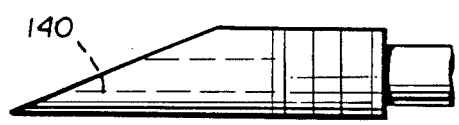
FIG. 18 is a partial side view of the device illustrated in FIG. 17.

Referring now to the preferred form of apparatus for deforming a continuously extruded tube form of plastic material, see FIG. 3 and the following sectional views FIGS. 4 through 9. It will be observed that there are five collapsing steps performed thereby, four incrementally progressive steps of folding the bottom section 13 of the tube form upwardly along the center plane of symmetry, and a fifth step of laterally iward collapse. Each and all of these five steps involves bending, and is essentially if not completely devoid of stretching or elongation of the tube wall of the pipe liner L, in its transverse cross-section. Each step of collapse is performed by forming means, preferably in the form of shaping rollers R1, R2, R3 and R4, followed by shaping rollers S1 and S2. It is these rollers which increasingly and progressively collapse the extruded tube form. In practice, the shaping rollers R1-R4 are lowermost, there being back-up rollers B1, B2 and B3 to support the tube form as it is impressed upon by tye said rollers R1-R4. As shown, the rollers R1-R4 and B1-B3 are on spaced and parallel horizontally disposed and transverse axes.

Back-up roller B1 is disposed over the shaping roller R1 (see FIG. 4) and is characterized by its concaved spool-shape 25 at the center plane of symmetry and conforming to the substantially semi-circular back-up section 12 of the tube form. Back-up roller B1 has opposite flaring side flanges that embrace the initial formation of the side sections 14 and 15 of the tube form.

Shaping roller R1 (see FIG. 4) is characterized by its convex fold initiating and shaping perimeter 27 at the center plane of symmetry to depress the tube form wall upwardly at bottom dead center. Shaping roller R1 has opposite concave side flanges 28 that embrace the initial formation of the lower extremities 21 and 22 of the side sections 14 and 15. The perimeters of roller flanges 26 and 28 are closely related so as to capture the tube form therebetween.

Back-up roller B2 is disposed over and intermediate shaping rollers R2 and R3 (see FIG. 3) and is characterized by its concaved spool shape 35 at the center plane of symmetry and conforming to the substantially semi-circular back-up section 12 of the tube form. Back-up roller B2 has opposite flaring flanges 36, to a lesser extent than that of roller B1, to embrace the formation of the side sections 14 and 15 of the tube form.

Shaping roller R2 (see FIG. 5) is characterized by its convex fold shaping perimeter 37 at the center plane of symmetry to further shape the tube form wall upwardly along said plane of symmetry. Shaping roller R2 has opposite concaved side flanges 38 that embrace the lower extremities 21 and 22 of the side sections 14 and 15. The perimeters of roller flanges 36 and 38 are somewhat spaced and guide the tube form therebetween.

Shaping roller R3 (see FIG. 6) is characterized by its convex fold shaping perimeter 47 at the center plane of symmetry to further shape the tube form wall upwardly along said plane of symmetry. Shaping roller R3 has opposite concaved side flanges 48, of lesser extent than roller R2, that embrace the lower extremities 21 and 22 of the side sections 14 and 15. The perimeters of roller flanges 36 and 48 are somewhat spaced and guide the tube form therebetween.

Back-up roller B3 (see FIG. 7) is disposed over shaping roller R4 and is characterized by its concaved spool-shape 55 at the center plane of symmetry and conforming to the substantially semi-circular back-up section 12 of the tube form. Back-up roller B3 has minimized side flanges 56 that embrace the side sections 14 and 15 of the tube form.

Shaping roller R4 (see FIG. 7) is characterized by its most sharply convexed fold shaping perimeter 57 at the center plane of symmetry to still further shape the tube form wall along said plane of symmetry. Shaping roller R4 has opposite concaved side flanges 58, of still lesser extent than roller R3, that embrace the lower extremities 21 and 22 of the side sections 14 and 15. The perimeters of roller flanges 56 and 58 are closely related so as to capture and guide the tube form therebetween.

The fifth and final collapsing step is performed by a pair of laterally positioned shaping rollers S1 and S2 disposed at opposite sides of the tube form as it emanates from shaping roller R4 (see FIGS. 8 and 9). Rollers S1 and S2 are to reduce the arcuate cross-section of back-up section 12 of the tube form, as shown. Accordingly, the rollers S1 and S2 are disposed on spaced and parallel vertical axes and are characterized by a concave spool shape 60 of curvilinear configuration increasing in curvature from top dead center, each roller, from the initial full radius of the tube form to the smaller radius of the lower extremities 21 and 22. The rollers S1 and S2 have top and bottom flanges 61 and 62 which are peripherally juxtaposed so as to completely capture the finally collapsed and deformed tube form, thereby establishing the product pipe liner L.

In accordance with this invention, and as best illustrated in FIGS. 8 and 9 of the drawings, the tube form of pipe liner L is finally collapsed onto a rail R disposed between the shaping rollers S1 and S2. The rail R is of a cross-sectional configuration to conform with the inside walls of the side sections 14 and 15 and of the lower extremities 21 and 22. Accordingly, and as clearly shown, the final cross-sectional configuration of the pipe liner L is established. In practice, the rail R has sliding engagement with the tube form and is of substantial longitudinal extent so as to enable a reduction in temperature and firming up while being held in the required cross-sectional configuration. Note particularly the hourglass cross-section of the rail R that accommodates the aforementioned collapsing of the lower extremities 21 and 22, bringing them closer together in relation to the center plane of symmetry than the upstanding inner walls extending to the bends of fold 16. In practice, rail R is optional depending on the shape to be defined. If a precise curvature 16 is necessary, the rail R will aid in keeping such a shape. This rail R, for example, would be necessary for the bud fusion of the deformed pipe.

From the foregoing, it will be observed that the shaping of the tube form is gradual and progressive (see FIGS. 3 and 9) and from FIG. 1 it will be observed that the temperature control is involved, and the preferred material involved is a thermoplastic. Accordingly, and as best illustrated in FIG. 3 of the drawings, there are water nozzles 70 that dispense tempered water so as to maintain the temperature of, for example, 210° F. in order to soften the plastic material and to ensure its bending properties. Other heat sources such as hot air or radiant heat can be incorporated to obtain the desired temperature of the pipe, which is to be above the raw materials' crystallization point. Nozzles 70 disseminate hot water into the area of the shaping rollers R1 through R4 and S1 and S2. Thus, the tube form is made plastic so as to be shaped and bent into the desired deformed condition. Following the final shaping of the tube form and its sliding engagement on the rail R, the shape enabling temperature of the plastic tube form is reduced to ambient by water nozzles 71 that dispense tempered water at lower temperature so as to cool the finished pipe liner L to, for example, 70° F., all as shown in FIGS. 1 and 3 of the drawings. As shown in FIG. 3, the tempered water is collected in a sump or pan 72 for its recirculation as shown in FIG. 1. The cooling means C2 reduces the tube form to ambient temperature on or passing into delivery from the rail R.

As shown in FIG. 3 of the drawings, the rollers B1–B3, R1–R4 and S1 and S2 are free to turn on bearings 73 and thereby enable forward motion of the tube form through the apparatus as described. However, as thin-walled large diameter pipe liners L are processed, it becomes necessary with some materials to assist movement of the tube form therethrough. Accordingly, torque means M in the form of motors M, electrical or hydraulic, provide the assist required (see FIG. 4). It is to be understood that anti-friction bearings 73 are provided with shafting 74, all as is shown throughout the drawings.

From the foregoing, it will be understood that a tubular pipe line L is provided that is reduced in cross-sectional configuration so as to be readily inserted into pipe lines and then reformed to its initially extruded cross-sectional configuration, whereby it properly fits into the pipe line for which it is designed, all as differing circumstances require.

To insert the liner L into a pipe line and reform it, and with reference now to FIGS. 10–26, a cylindrical section 80 of pipe to be lined is shown. The pipe is formed with radial flanges 82, 84 at either end to enable connection with adjacent pipe sections in a conventional manner.

While the pipe lining procedure is shown primarily in schematic form, it will be understood that the pipe may be lined above ground or, in situ, underground or underwater. In any or all of the above cases, it may be necessary to disconnect the pipeline at selected, longitudinally spaced access points and, if continuous pipeline flow is required, splice in a bypass section between pipe sections on either side of the section to be lined. This bypassing or splicing procedure forms no part of the present invention and need not be described further.

Before commencing the lining operation, the pipe section should be inspected to determine its ability to withstand pressures applied during the lining operation. Of course, if the pipe is damaged, corroded, etc. to the point of not being able to withstand such pressures, then the pipe section in question must to be replaced rather than lined.

The interior of the pipe 80 may be cleaned by a conventional brush pig 86 designed to traverse the pipe interior with brushes extending radially into contact with the interior pipe wall, to effect removal of loose material, residue, sediment, and the like which might otherwise negatively impact the lining process. Once the pig 86 is introduced into the upstream end of pipe 80, upstream and downstream manifolds 88 and 90 are attached to the pipe flanges 82, 84, respectively. To facilitate this connection, the manifolds are provided with abutting flanges 82', 84' and connection is achieved via bolts or other suitable fasteners in conjunction with aligned apertures (FIG. 25) in the respective flanges.

A pulling or pilot line 92, fed from a reel 94 through a vent hole 96 in the manifold 88, is attached to the trailing end of the pig 86 before closure of the upstream manifold 88.

The upstream manifold 88 has a closed end 98 which comprises a removable plate, and in which is mounted an inlet valve 100. In this initial pigging operation, the valve 100 is connected via conduit 102 to a pressurized air or liquid source 104. The downstream manifold 90 is also provided with an end plate which mounts a relief valve 106. A pressure gauge 108 monitors pressure within the pipe.

Pressurized air or water is introduced through a valve 100 into the pipe behind the pig 86, so as to push the brush pig and pulling line 92 through the pipe to the downstream end thereof. During this pigging operation, relief valve 106 is set at about 100 psi to ensure proper degassing of the pipe as the pig moves to the downstream end of the pipe. When the pig 86 reaches the downstream end, and moves into the manifold 90, the interior pressure of the pipe is gradually released, manifolds 88 and 90 are opened, and pig 86 removed. Thereafter, line 92 may be drawn out and subsequently fastened to an associated winch or reel 110 as shown in FIG. 11.

With further reference to FIG. 11, the pipe section 80 is shown with manifolds 88 and 90 opened at their remote ends and with an initial lightweight fishing line 92 connected to a heavier gauge pulling or pilot line 112. Lines 92 and 112 are pulled through the pipeline 80 by winch 110 located adjacent the downstream end of the pipeline 80 and manifold 90. The pilot line 112 is unwound from a reel 114 at the upstream end of the pipeline section. As indicated earlier, the requirement for progressively stronger pilot or pulling lines is necessitated only if the pipeline section to be lined is of great length or, if there is an inability to build up sufficient pressure, by reason of leakage for example, in the existing pipeline, to push the pig 86 and associated fishing or pilot line through the pipe section. Once the appropriate gauge pulling line is drawn through the pipe section 80, it may be cut adjacent the upstream manifold 88 and thereafter attached to the temporarily deformed U-shaped liner L, as more clearly illustrated in FIG. 12. The pulling line 112 is connected to the U-shaped liner L by a suitable gripping arrangement shown in schematic form at 116 in FIG. 12. Preferably, the gripping means 116 is of the radial expansion type so as to prevent damage to the end of the liner. As also illustrated in FIG. 12, the U-shaped liner L may be unwound from a storage or supply reel S which is located adjacent the upstream manifold. It will be appreciated that depending on the diameter of the originally extruded liner L, the liner may be temporarily deformed at the factory and shipped in continuously wound reels S or, where the diameter of the originally extruded pipe is so large as to make such predeformation and shipment impractical, mobile deforming apparatus may be provided at the site for deforming the liner L in situ and pulling it through the pipe section to be lined in one continuous operation. A mobile deforming apparatus may be provided constituting the same principle as the apparatus disclosed in this invention, with the exception that the heating device before deforming will be extended to raise the temperature of the now ambient round pipe to past its crystallization point. In other words, the benefit of an already warm pipe (out of the extruders' vacuum trough) is not available working with a mobile deforming tool.

Figure 15:
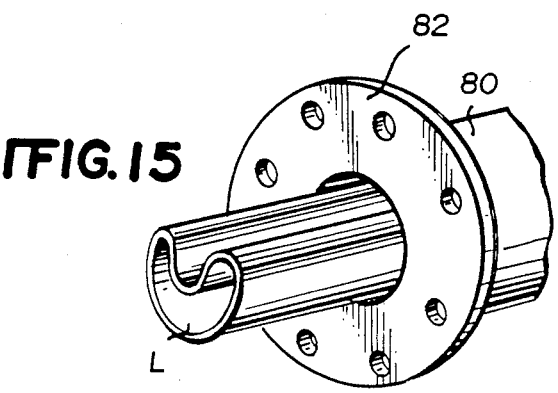
FIG. 15 is a partial, perspective view illustrating a temporarily deformed liner within a pipe section to be lined.
Figure 14:
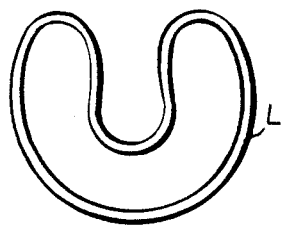
FIG. 14 is a cross-sectional view of a temporarily deformed pipe liner in accordance with the invention.
Figure 13:
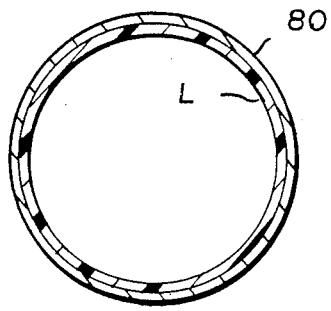
FIG. 13 is a cross-sectional view of a pipe section and associated liner.

FIG. 13 illustrates a cross-sectional view of pipeline section 80 with the liner L in its finally expanded form. This is to contrasted with the cross-sectional view of the pipe liner L in FIG. 14 which illustrates it in its temporarily deformed U-shape. In FIG. 15, a perspective view illustrates the temporarily deformed U-shaped liner L after it is pulled through the pipe section 80 to be lined. Turning now to FIG. 16, it will be noted initially that the liner L extends approximately to the open ends of the manifolds 88 and 90 to not only facilitate the expansion process, but also to leave sufficient liner to form radial flanges in a manner to be described in greater detail below.

In FIG. 16, there is schematically shown a representation of the initial expansion of the liner L within the pipe 80. Once the liner is properly positioned, a pair of mechanical expansion/packer assemblies are inserted into the liner from either end of the upstream and downstream manifolds 88, 90. The packer/expander assemblies 120, 122 are identical in every respect and, therefore, only one need be described in detail. As best seen in FIGS. 6-18, the downstream packer/expander 122 assembly includes an inlet conduit or manifold 124 operatively connected to a closed boiler 126 through which hot liquid may be introduced into the liner via valve 128. The temperature of the liquid is monitored by a conventional gauge 130, while the pressure within the liner is monitored by a conventional pressure gauge 132. Inlet pipe 124 is connected via pipe extension 124' to a cylindrical packer assembly 134 consisting of conventional packing rings which are sized to seal off the liner relative to the manifold 90 to prevent any escape of liquid from the liner through the manifold. A cylindrical wedge-like expander 136, provided with a tapered surface 138, extends forward of the packer assembly and serves to force the liner end back into a cylindrical shape, as best seen in FIG. 16. A similar arrangement is provided at the upstream manifold 88 so that the liner L is initially expanded mechanically at both ends in the above described manner. The expander 136 is provided with an internal bore 140 (FIGS. 17 and 18) which operatively connects to the inlet conduit 124 and closed boiler 126. It will thus be appreciated that expander 136 only initiates the expansion process, while facilitating introduction of hot liquid through the bore 140 and into the liner L.

Once the packer/expander assemblies 120, 122 have been positioned within the manifolds 88, 90, respectively, so that flanges 142 abut corresponding flanges on the manifolds 88, 90, hot water is introduced from the source 126 into the interior of the liner. Because the system is closed, the hot water may be raised to high temperatures without the creation of steam and, in this initial stage, the hot water is introduced into the liner so as to raise the temperature of the liner above its crystallization point. In the temperature raising stage, a relief valve 144 in the packer/expander assembly 120, allows hot water to flow continuously through the liner, at a first pressure of about 7 bars. It will be appreciated that the period of time required to reheat the liner to its shape memory temperature at the first pressure will depend on the diameter and length of the pipe to be lined.

Once the liner has been heated the U-shaped memory of the liner is erased and the liner tends to assume its original cylindrical shape. However, as previously mentioned, because the interior wall of the pipe 80 may not be perfectly round, the now cylindrical liner L may not conform exactly to the inner surface of the pipe which may be warped, particularly over extended distances. Accordingly, the pressure inside the liner is raised in a second stage to about 15 bars to expand the liner L into substantially exact conformance with the interior surface of the pipe 80, as illustrated in FIG. 19. The process manifold is further equipped with an air outlet (air leak) that enables the air or liquid which might have been trapped between the liner and the original pipe to escape. This is another reason why the manifold is slightly oversized as compared to the O.D. of the liner.

Thereafter, valve 128 is closed, hot water supply 126 disconnected, and the hot water within the pipe is emptied. The packer/expander assemblies 120, 122 are then withdrawn. It is a further feature of this invention that, while the liner is still hot, a conventional expansion pig, having a diameter substantially identical to the inside diameter of the expanded liner, is introduced into the pipe 80 and is pushed through the pipe section applying a radial force to the liner so as squeeze any remaining air from between the pipe and liner so as to conform 100% of the liner surface against the interior surface of the pipe. The pig is preferably driven by a supply of cold water which more or less "freezes" the plastic into final form behind the pig, eliminating all air spaces between the liner and the pipe section.

While the expansion stage has been described with reference to the introduction of heated fluid from source 126 at the downstream side of the pipe 80 via packer/expander assembly 122, it will be appreciated that source 126 may be operatively connected to the upstream assembly 120 as well. In this regard, manifolds 88, 90 and assemblies 120, 122, including conduit 124 are provided with the necessary inlets, outlets for monitoring devices, relief valves, and the like so that, in effect, they are interchangeable.

Turning now to FIGS. 20 through 22, a schematic progression of steps involved in the liner end flaring process is illustrated. Thus, FIG. 22 shows the expanded liner L extending beyond pipe 80, with the manifold 88 removed. Typically, the liner will be trimmed in accordance with predetermined and calculated data establishing the length of liner required to produce a given size radial flange for pipes of various diameters. Once the liner is trimmed, a first flaring stage commences wherein the liner end is heated, by an air gun for example, to about 180°-200° F., and flange 148 is partially formed at an angle of about 50° to about 70°, relative to horizontal, as shown in FIG. 21. The specific angle will depend on factors such as the diameter of the pipe, the flange length, and so on. Once the initial flare is formed in the liner end, the latter is quickly cooled and then reheated to about 180°-200° F. In a second flaring stage, the partially flared end is further deformed into engagement with pipe flange 82 to form radial flanges 148 as illustrated in FIG. 22, after which the liner is again quickly cooled.

FIG. 23 illustrates an exemplary flaring tool for carrying out the first and second flaring stages as described above. A manually operated screw jack 150 is fastened at at least two locations, preferably 180° apart, about the pipe flange 82. Thus, a pair of heavy duty bolts 152 extend between bolt holes formed in the flange 82 and a cross bar 154. Bar 154 is provided with a threaded aperture 156, intermediate the ends thereof, for receiving a threaded jack member 158 which mounts a flaring tool 160, a packing assembly 162, a washer 164 and a nut 166 on one side of the cross-bar 154, and a handle 168 on the other side of the cross bar. Rotation of handle 168 in a clockwise direction will result in flaring tool 160 entering the liner end to flare the same in a first flaring stage as previously described. The packer assembly 162 is utilized to prevent the liner L from creeping into the pipe 80 during the flaring operation. After completion of the first flaring stage, tool 160 is removed from jack 158 and is replaced by a second stage flaring tool 170, shown in FIG. 24. This second stage tool is no more than a bored, cylindrical block which flattens the partial flare into full engagement with the pipe flange 82. In this regard, FIG. 25 shows in an end view, the liner L in its finally flared and expanded configuration within the pipe 80.

In further connection with the first and second flaring stages, it will be appreciated that the speed with which the flaring tools are brought into engagement with the liner end or ends must be correlated to the pipe diameter, temperature, etc. to prevent damage to the end or ends. Thus, the flaring tools do not engage the liner end or ends, until the temperature, monitored by conventional means, reaches the predetermined level. In addition, during the flaring stages, the tools remain in full pressure engagement with the liner end or ends during the respective cooling steps.

It will be further appreciated that the screw jack 150 may be hydraulically actuated, particularly for larger diameter pipes.

In FIG. 26, there is illustrated a plurality of adjacent pipes 80, each having an individual liner L applied in accordance with the above described process. The formation of radial flanges 148 on each liner section results in a continuous interior lining with no pipe exposure to the materials flowing through the pipeline. This of course is an alternative to introducing a single continuous liner through a plurality of single pipe sections, but with similarly effective results.

For those pipes typically in service under pressure, it has been found that it is not necessary to heat the liner to its crystallization point in order for the liner, after being reformed, to remain frozen in its original generally cylindrical shape, provided the liner is maintained under pressure for an extended period of time. That pressure may, in accordance with the present invention, comprise the pressure of the liquid in the pipe when in normal service. Consequently, after the interior of the pipe to be lined is cleaned by the conventional brush pig 86, the manifolds 88 and 90 are in place and the deformed liner is inserted into the pipe, the liner can be mechanically reformed to its original, generally cylindrical shape with the use of a pig and applied pressure. Consequently, in this embodiment, the ends of the manifolds are initially deformed as previously described and the pig is inserted, preferably at the downstream end. The pig may be conventional and may comprise a medium density foam. Upon initial insertion of the pig, the ends of the pipe are closed and a fluid under pressure, for example, air, under a pressure between about 25 and 150 p.s.i., depending on the pipe size and length, is introduced behind the plug at the downstream end. Additionally, a back pressure or vacuum pressure is provided at the upstream end of the pipe, for example, on the order of about 5 to 40 p.s.i., again depending upon the length and size of the pipe. Because of the differential pressure applied to the pig, the pig advances from the downstream end of the pipe to the upstream end, mechanically reforming the pipe to its generally cylindrical configuration as it moves between those ends. Upon arrival at the upstream end, the pressure is maintained behind the pig throughout the length of the pipe and liner for a predetermined time interval, for example, about 30 minutes. The pipe liner is then depressurized and both manifolds and the pig are removed. Both ends of the liner are subsequently flared, as described previously, and the fluid service is reconnected.

It has been found that if the service is reconnected and pressure applied to the interior of the liner from the service fluid flowing through the liner within a predetermined time, for example, within about 24 hours after completion of the liner installation, particularly after the liner has been depressurized, such pressure will ensure that the liner conforms to the walls of the existing pipe. It has also been found that over time, for example, on the order of about 3 or 4 weeks, the stresses within the liner are relieved and the liner will remain generally cylindrical, even when the pressurized service fluid is subsequently removed. Consequently, the foregoing lining process may be used for lines that are not normally under pressure, provided the pressure is maintained within the liner for the predetermined time necessary to relieve the stresses in the liner tending to deform the liner to its initial deformed shape. The time required is a function of the diameter, wall thickness and material of the liner and the degree of circularity required. For example, if an expanded but non-cylindrical configuration of the liner in the pipe is acceptable, the time period during which the liner is held under pressure may be less than one week. On the other hand, such time period should be on the order of 3-4 weeks if a perfectly cylindrical liner is required. Consequently, the use of high temperature fluids to relieve the stresses in the liner as previously discussed is not necessary where the pressure can be maintained in the liner for a predetermined time period after mechanical reformation. This technique is therefore particularly useful for relining pipes wherein fluid under pressure is the typical fluid being transmitted by the pipe.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A process for installing a thermoplastic liner in a pipe for flowing a service fluid under pressure through the pipe liner comprising the steps of:

provicing a hollow generally cylindrical liner formed of thermoplastic material having a shape memory activation temperature;

reducing the cross-sectional shape of said liner at said shape memory activation temperature and cooling said reduced liner to a temperature substantially below said shape memory activation temperature, such that the liner retains a memory of its cylindrical shape, thereby to maintain the liner in said reduced shape and enable the reduced liner to be pulled into the pipe;

disposing the reduced liner into said pipe such that end portions of said liner extend beyond the opposite ends of the pipe;

partially expanding the liner end portions which extend beyond the opposite ends of the pipe by mechanical means inserted into said liner end portions such that said expanded liner end portions approximate the original cylindrical shape of the liner;

sealing the expanded liner end portions beyond the opposite ends of the pipe to seal the interior of said liner at its opposite ends;

mechanically reforming the reduced liner by passing a pig through the liner between the sealed ends thereof to expand the liner to cause the liner to return to its generally cylindrical cross-section and bear against the interior walls of the pipe;

the step of passing the pig including providing a differential pressure on opposite sides of the pig within the liner to propel the pig between the sealed ends of the liner;

subsequent to mechanically reforming the liner to its generally cylindrical cross-section and while maintaining said liner sealed, maintaining the interior of the liner from end to end under a pressure at least as great as the pressure behind the pig when passing the pig through the liner for a predetermined time to maintain the liner against the interior walls of the pipe and to substantially relieve the stresses in the liner otherwise tending to cause the liner to return to its reduced shape;

then depressurizing the liner and removing the mechanical means; and then pressurizing the liner with the service fluid for a period of time sufficient to fully relieve the stresses in the liner so that the liner is maintained in its generally cylindrical remembered shape.

2. The process according to claim 1 wherein the step of maintaining the interior of the liner under pressure is performed for a specified time interval on the order of about thirty minutes and connecting the liner to the pressurized service fluid before the lapse of a predetermined time interval on the order of about 24 hours.

3. The process according to claim 1, wherein the step of maintaining the interior of the liner under pressure uses the same pressure fluid used for advancing the pig through the liner.

4. The process according to claim 1 wherein the step of mechanically reforming the liner to its generally cylindrical cross-section is accomplished substantially solely by maintaining the interior of the liner from end to end under pressure for said predetermined time without substantially elevating the temperature of the pressure fluid.

5. The process according to claim 1 wherein the step of mechanically reforming the liner to its generally cylindrical cross-section is accomplished substantially solely by maintaining the interior of the liner from end to end under pressure for said predetermined time without substantially elevating the temperature of the pressure fluid.

* * * * *